UNITED STATES PATENT OFFICE.

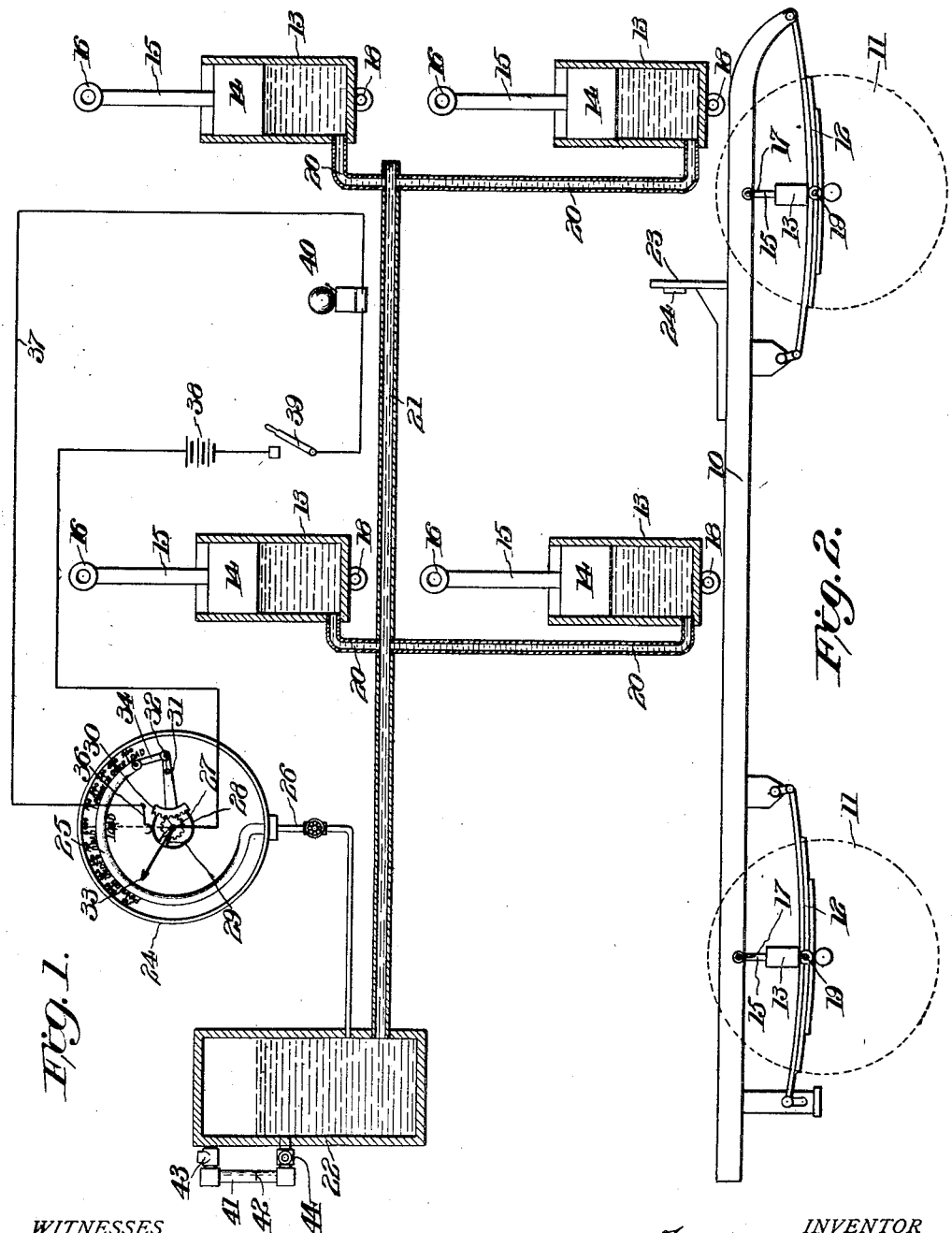

FREDERICK J. TROLL, OF BALTIMORE, MARYLAND, ASSIGNOR OF ONE-HALF TO DOUGLAS H. THOMAS, JR., OF BALTIMORE, MARYLAND.

COMBINED LOAD INDICATOR AND ALARM FOR MOTOR-TRUCKS.

1,147,128.  Specification of Letters Patent.  Patented July 20, 1915.

Application filed June 8, 1912. Serial No. 702,508.

*To all whom it may concern:*

Be it known that I, FREDERICK J. TROLL, a citizen of the United States, residing at Baltimore, in the State of Maryland, have invented certain new and useful Improvements in Combined Load Indicators and Alarms for Motor-Trucks, of which the following is a specification.

This invention relates to a combined load indicator and alarm for motor trucks, and may be termed a "loadometer".

Motor trucks are sometimes equipped with a sign disposed at some convenient point on the vehicle to indicate the pound capacity thereof. Warnings are also located on the vehicle to the effect that it should not be loaded to an extent beyond its rated carrying capacity, say for instance, 6000 pounds. The reason for such notices and warnings is that overloads place the truck under unnecessary strain and impair the life of the truck. A cautious driver, in some instances, in order to be on the safe side may underload the truck thereby reducing the operative efficiency by increasing the unit cost per pound of the materials handled. Careless drivers are likely to overload the truck thereby increasing the repair cost, tire expense, etc., with the result that from the manufacturer's view point, the reputation of the truck is affected to the disadvantage of the manufacturer by reason of complaints from owners or purchasers of motor trucks.

It is therefore one object of my invention to provide an apparatus particularly adapted for association with motor trucks to indicate underloads and overloads in units of one hundred pounds more or less so that the rated capacity of the truck will not be abused or the operating efficiency not reduced because of failure to load the truck to its rated capacity.

Another object resides in the provision of a fluid pressure means which may be readily applied to any motor truck without any alterations to the latter and which will effectively operate so that the full load may always be carried and an underload or overload always known to the driver or other attendant.

It is further designed to provide means for application to a motor truck embodying among other characteristics an audible alarm which will sound in the event of the truck reaching its rated capacity and continue to sound until the truck is relieved of its overweight so that the driver will know that to preserve the life of the truck and to discontinue the alarm some of the materials must be removed from the truck to reduce the weight on same.

With the above and other objects in view the present invention consists in the combination and arrangement of parts hereinafter more fully described, illustrated in the accompanying drawings and particularly pointed out in the appended claims, it being understood that changes may be made in the form, size, proportion and minor details without departing from the scope or sacrificing any of the advantages of the invention.

In the drawings:—Figure 1 is a diagrammatic view of my invention. Fig. 2 is a side elevation of a truck chassis indicating the application of the visible parts of my invention thereto.

In the embodiment of the invention as illustrated in the accompanying drawings I employ a plurality of fluid pressure changing devices, preferably four in number, with these fluid pressure changing devices preferably located in close proximity to the ends of the front and rear axles of the body 10 of the motor vehicle chassis supported upon the wheels 11, there being the usual elliptical shaped springs 12 arranged between the axles of the wheels and the body 10.

The fluid pressure changing devices each consists preferably of a fluid chamber 13 in which is mounted a piston 14 whose piston rod 15 is provided with an aperture 16 whereby the piston may be pivotally supported on the chassis by means of a suitable fastening 17 there being a lug 18 formed on the bottom of each chamber 13 whereby each chamber may be pivotally secured to the corresponding spring as indicated at 19. These compression chambers 13 have pipe connection 20 with a main trunk line 21 which latter communicates at one end with a reservoir 22 adapted to contain a sufficient amount of oil or other fluid to supply the requisite fluid supply necessary in the fulfillment of the functions necessary in my invention.

Arranged on the dash board 23 of the truck in any suitable manner is an indicator 24 preferably of the Bourbon type and of low pressure gage whose tube 25 has connection with a valved pipe 26 leading to the reservoir 22.

Mounted centrally of the indicator 24 is an axis on which is mounted a pinion 27 and an insulated ring 28 carrying on its periphery a contact 29, there being a segmental rack member 30 carried at the inner end of an arm 31 pivoted at 32 on the indicator for coöperation with said pinion 27 to move the indicator hand 33 over the dial under the influence of the pressure incident to weight placed on the truck. To operate the hand 33 through the instrumentality of said pinion 27 and the rack segment 30, the outer end of the arm 31 is pivoted to one end of a link 34 which is pivoted at its opposite end to the free end of the tube 25 so that as the tube 25 is straightened out under the influence of pressure therein from the reservoir 22 by way of the pipe 26, the arm 31 is moved on its pivot 32 accordingly and consequently the hand 33 is shifted over the face of the dial.

As the hand 33 is shifted over the face of the dial the ring 28 is revolved therewith to bring the contact 29 of the ring eventually into engagement with the thin brush 36 mounted on the indicator.

An alarm circuit 37 is connected with the thin brush 36 and with the axis of the indicator 24 and includes a suitable battery 38, a switch 39 and an alarm 40 so that when the contact 29 is revolved into engagement with the brush 36 at which time the hand 33 is visibly indicating that the truck has reached its full rated capacity or has been overloaded, there is established a circuit through the battery 38, switch 39 and alarm 40 with the result that the alarm 40 audibly indicates simultaneously with the visual indication that the truck has reached its full rated capacity or overweight. The alarm 40 may be located anywhere on the truck but the switch 39 is preferably disposed on the dash board.

If a heavy machine or other concentrated load, or if for any other reason any preponderance of load be placed at either the extreme front or back or side of the truck, causing any two of the springs of the vehicle to be depressed more than the other two, and consequently but two of the fluid pressure changing devices acted upon to any appreciable extent, or more than the other two, the indicator 24 would accurately register the load, because the proper amount of pressure corresponding to the load exists in the reservoir 22 because the sum of the vertical movements of the greater depressed springs will equalize the sum of the vertical movements of all four of the springs if the load had been so applied as to cause all four of the springs to be equally depressed.

The operation of the apparatus may be stated as follows: When about to load the truck the switch 39 on the dash board is closed. As the materials are placed on the truck the latter is depressed and the springs of the truck gradually flatten. Under the flattening action of these springs the pistons 14 of the fluid pressure resistance changing devices force the fluid from the cylinders 13 to the trunk line 21 by way of the pipes 20 and into the reservoir 22. The pressure of the fluid in the reservoir 22 forces the fluid through the valve pipe 26 to the tube 25 of the indicator 24. The pressure in the tube 25 causes the latter to straighten out and as it gradually straightens it causes a corresponding movement of the segment arm 31 on its pivot 32, because of the connection 34 between the arm 31 and the tube. As the segmental rack 30 operates under the influence of the tube 25, in the manner just described, it causes rotation of the axis and a consequent rotation of the pinion 27 and ring 28, moving the indicator hand 33 accordingly.

Upon the vehicle receiving a predetermined weight of goods, or in other words, its maximum or rated capacity, the contact 29 of the ring 28 will have been brought into engagement with the brush 36 of the indicator and the index hand 33 will reach the dotted line position shown in Fig. 1. This establishes a current which passes through the indicator, the battery 38, switch 39 and alarm 40 with the result that when the contact 29 engages the brush 36 the alarm circuit is supplied with a current which causes the alarm 40 to operate and which alarm will operate and continue to operate to audibly indicate that the rated capacity has been reached or that the vehicle is overloaded until the operator either opens the switch 39 or removes the preponderance of weight from the vehicle.

Assuming that the maximum or rated capacity of the vehicle is 6000 pounds, it will be understood that when the indicator hand 33 registers with the graduation indicating 6000 pounds or over, that the alarm is sounded. At this point it might be stated that on the dial of the indicator the numeral 6 of the 6000 pound load mark could be changed to 4, making the indicator a 4000 pound indicator or loadometer, which it may be termed a 4000 pound instead of a 6000 pound loadometer. By virtue of this slight change which may readily be made one type and size of loadometer could be used on any size or capacity of motor truck.

In the event of a weakening of the springs 12 causing the springs to be depressed or flattened out of their normal condition, when no load is on the truck, thus causing the pistons 14 to be moved from their normal operative position and thereby accidentally exerting pressure when none should be exerted, I adjust this condition by providing reservoir 22 with a glass tube gage 41 with indicating mark 42, inlet cock 43 and outlet cock 44.

The level of the liquid in reservoir 22 should always be at the mark 42 when there is no load on the truck and should it be above that point due to the springs being out of their normal condition it is only necessary to open the outlet cock 44 and let a small amount of liquid run out until the proper level is reached.

Should the liquid be below the mark 42 due to leakage or any other cause, the normal level can be restored by placing more liquid in reservoir 22 by way of inlet cock 43.

What is claimed is:

1. The combination of a vehicle body, means for yieldably supporting the vehicle body so that it may be subject to depression under the influence of weight placed thereon, an electrical circuit carried by the vehicle, an indicator in said circuit, an alarm in said circuit, and fluid pressure means carried by the vehicle and operable upon depression of the yieldably supported body to actuate said indicator and subsequently complete the electrical circuit to operate the alarm, the body returning to its normal position and restoring the indicator and alarm to their initial positions upon relieving the body of its load.

2. The combination of a vehicle body, means for yieldably supporting the vehicle body so that the body is subject to depression under the influence of weight placed thereon, an electrical circuit carried by the vehicle, an indicator in said circuit, and fluid pressure means carried by the vehicle and operatively connected to the indicator to operate the latter upon depression of the body against the action of the yieldable supporting means, said yieldable supporting means returning the body and the fluid pressure means to normal position and restoring the indicator to initial position upon relieving the body of its load.

3. The combination of the axles, body and wheels of a vehicle, supporting springs adjacent to each wheel, fluid pressure changing devices connected to the body and the springs at each end of each axle, an indicator, and operative connections between the fluid pressure changing devices and the indicator to operate the latter.

4. The combination of the axles, body and wheels of a vehicle, supporting springs adjacent to each wheel, fluid pressure changing devices connected to the body and the springs and carried thereby, and an indicator connected to the fluid pressure changing devices and operable under the influence of the latter to indicate when the maximum load capacity of the vehicle has been reached.

5. The combination of the axles, body and wheels of a vehicle, supporting springs adjacent to each wheel, fluid pressure changing devices connected to the body and the springs at each end of each axle, and electrical means connected to the fluid pressure devices and operable under the influence of the latter to indicate the maximum load capacity of the vehicle.

6. The combination of the axles, body and wheels of a vehicle, supporting springs adjacent to each wheel, fluid pressure changing devices connected to the body and springs at each end of each axle, electrical means connected to the fluid pressure devices and operable under the influence of the latter to audibly indicate when the maximum load capacity of the vehicle has been reached.

7. The combination of the axles, body and wheels of a vehicle, supporting springs adjacent to each wheel, fluid pressure changing devices having operative connection with the springs for operation under the action of the latter and arranged one at each end of each axle, and means connected to the fluid pressure changing devices and operable under the influence of the latter to indicate when the maximum load capacity of the vehicle has been reached.

8. The combination of the axles, body and wheels of a vehicle, supporting springs between the axles and the body of the vehicle, fluid pressure changing devices having operative connection with said springs for operation under the influence of flattening of said springs incident to weight on the body of the vehicle, and electrical means having operative connection with the fluid pressure changing devices and operable under the influence of the latter to audibly indicate when the maximum capacity of the vehicle has been reached.

9. The combination of the axles, body and wheels of a vehicle, supporting springs between the axles and the body, fluid pressure changing devices having operative connection with the springs for operation under flattening of the latter incident to weight placed on the body, and means connected to all of the fluid pressure changing devices to indicate thereby the weight of the load placed on the vehicle and to indicate when the maximum load capacity has been reached.

10. The combination of the axles, body and wheels of a vehicle, supporting springs between the axles and the body, fluid pressure changing devices having connection with the springs for operation upon flattening of the latter incident to weight placed on the body, a common means operatively connected to all of the fluid pressure changing devices to indicate the weight of the load placed on the vehicle, and an alarm connected to said indicator to audibly indicate when the maximum load capacity of the vehicle has been reached.

11. The combination of a vehicle, including a body, means for yieldably supporting the vehicle body so that it may be depressed under the influence of a load placed thereon, fluid pressure changing devices carried by the vehicle and operable under the influence of the load placed on the vehicle body, an indicator having operative connection with said fluid pressure changing devices to visibly indicate when the maximum load capacity of the vehicle has been reached, and an alarm circuit connected to the indicator to audibly indicate when the maximum load capacity has been reached and including a battery, a switch and an alarm.

12. The combination of a vehicle body, means for yieldably supporting the vehicle body so that it may be subject to depression under the influence of weight placed thereon, fluid pressure means carried by the vehicle, and an indicator carried by the vehicle and connected to and operable under the influence of the fluid pressure means as the vehicle body is depressed under the influence of weight to visibly indicate when the weight capacity of the vehicle has been reached, said yieldable supporting means returning the body and the fluid pressure means to normal positions when the body moves to normal position when relieved of its load.

13. The combination of a vehicle body which is subject to depression under the influence of weight placed thereon, fluid pressure means having operative connection with the vehicle body, and an indicator operable under the influence of the fluid pressure means to visibly indicate when the weight capacity of the vehicle has been reached, and means operatively connected to the visible indicating means to operate simultaneously therewith when the predetermined capacity of the vehicle has been reached to audibly indicate that the rated capacity has been reached.

14. The combination of a vehicle including a body, means for yieldably supporting the vehicle body so that it may be subject to depression under the influence of weight placed thereon, fluid pressure means carried by the vehicle body for operation thereby, and an electric circuit on the vehicle having operative connection with the fluid pressure means to audibly indicate when the predetermined capacity of the vehicle has been reached.

15. The combination of a vehicle which is subject to depression under the influence of weight placed thereon, including axles, wheels and elliptical springs, a plurality of fluid pressure devices each consisting of a cylinder and a plunger with the respective plungers connected to the body of the vehicle and with the cylinders connected to the springs of the vehicle, a reservoir, a trunk line having communication with the reservoir and branches leading from the cylinders of the fluid pressure devices to the trunk line, an indicator including a tube having communication with said reservoir, the indicator including an axis, an index hand mounted on the axis, a pinion on the axis, a segmental member having teeth in mesh with said pinion and including an arm, a connection between the arm of the segmental member and said tube whereby upon movement of the tube incident to pressure from the reservoir the segmental member is operated and the axis revolved to shift the index hand on the indicator.

16. The combination of a vehicle which is subject to depression under the influence of weight placed thereon, including axles, wheels and elliptical springs, a plurality of fluid pressure devices each consisting of a cylinder and a plunger with the respective plungers connected to the body of the vehicle and with the cylinders connected to the springs of the vehicle, a reservoir, a trunk line having communication with the reservoir and branches leading from the cylinders of the fluid pressure devices to the trunk line, an indicator including a tube having communication with said reservoir, the indicator including an axis, an index hand mounted on the axis, a pinion on the axis, a segmental member having teeth in mesh with said pinion and including an arm, a connection between the arm of the segmental member and said tube whereby upon movement of the tube incident to pressure from the reservoir the segmental member is operated and the axis revolved to shift the index hand on the indicator, an insulating ring mounted on the axis of the indicator and including a contact, a brush on the indicator into registration with which the contact of said ring is brought into registration upon rotation of the axis as described, an electrical circuit having operative connection with the indicator and said brush and including a switch, a battery and an alarm which latter is adapted to audibly indicate that the rated capacity of the vehicle has been reached when said contact is brought into registration with said brush.

17. The combination of a vehicle including a body, means for yieldably supporting the body so that it may be subject to depression under the influence of weight placed thereon, fluid pressure means carried by the vehicle for operation upon depression of the vehicle body, and means carried by the vehicle and connected to the fluid pressure means for operation under the influence of the latter to indicate when the maximum load capacity of the vehicle has been reached.

In testimony whereof I affix my signature in presence of two witnesses.

FREDERICK J. TROLL.

Witnesses:
 WALTER M. TROLL,
 DE WITT C. KOTHE.